(12) United States Patent
Newman

(10) Patent No.: US 12,192,666 B2
(45) Date of Patent: *Jan. 7, 2025

(54) GPS TIMING FOR VIDEO FRAMES

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 17/842,334

(22) Filed: Jun. 16, 2022

(65) Prior Publication Data

US 2022/0311909 A1   Sep. 29, 2022

Related U.S. Application Data

(63) Continuation of application No. 17/096,597, filed on Nov. 12, 2020, now Pat. No. 11,388,314.

(51) Int. Cl.
| | | |
|---|---|---|
| *H04N 5/04* | (2006.01) | |
| *G04R 20/04* | (2013.01) | |
| *G11B 27/10* | (2006.01) | |
| *H04N 23/51* | (2023.01) | |
| *H04N 23/54* | (2023.01) | |
| *H04N 23/55* | (2023.01) | |

(52) U.S. Cl.
CPC ............... *H04N 5/04* (2013.01); *G04R 20/04* (2013.01); *G11B 27/10* (2013.01); *H04N 23/51* (2023.01); *H04N 23/54* (2023.01); *H04N 23/55* (2023.01)

(58) Field of Classification Search
CPC ...... G04R 20/04; G11B 27/031; G11B 27/10; H04N 23/51; H04N 23/54; H04N 23/55; H04N 5/04

See application file for complete search history.

(56) References Cited

U.S. PATENT DOCUMENTS

| | | | |
|---|---|---|---|
| 8,245,262 | B2 | 8/2012 | Kashyap |
| 8,913,158 | B2 * | 12/2014 | Sugimoto ............ H04N 9/8205 348/231.6 |
| 10,957,360 | B1 * | 3/2021 | Hastings ................. G06V 20/46 |
| 2013/0013185 | A1 | 1/2013 | Smitherman |
| 2015/0098021 | A1 * | 4/2015 | O'Sullivan ........ H04N 21/4223 348/516 |
| 2017/0006340 | A1 | 1/2017 | Enke |
| 2017/0374265 | A1 * | 12/2017 | Finlow-Bates .......... G01S 19/14 |
| 2019/0354776 | A1 * | 11/2019 | Ribeiro ............ G08B 13/19695 |
| 2021/0400195 | A1 * | 12/2021 | Adato .................... G06V 20/00 |

* cited by examiner

*Primary Examiner* — Amy R Hsu
(74) *Attorney, Agent, or Firm* — ESPLIN & ASSOCIATES, PC

(57) ABSTRACT

An image capture device may receive GPS data during capture of video frames. GPS data may be used to increase accuracy of GPS time of the image capture device. GPS time of the image capture device at a later moment in the capture duration may be used to determine the times of earlier captured video frames.

20 Claims, 5 Drawing Sheets

GPS TIMING FOR VIDEO FRAMES

FIELD

This disclosure relates to utilizing Global Positioning System (GPS) timing for video frames captured by an image capture device.

BACKGROUND

Time/clock of an image capture device may be inaccurate. Inaccurate time/clock of the image capture device may lead to inaccurate timing of video frames captured by the image capture device. Inaccurate timing of video frames may cause inaccurate synchronization of video frames captured by different image capture devices.

SUMMARY

This disclosure relates to utilizing Global Positioning System (GPS) timing for video frames captured by an image capture device. An image capture device may include a housing. The housing may carry one or more of an image sensor, an optical element, a GPS receiver, and/or other components. The optical element may guide light within a field of view to the image sensor. The image sensor may generate a visual output signal conveying visual information defining visual content based on light that becomes incident thereon. The GPS receiver may receive GPS signals conveying broadcast times of the GPS signals from GPS satellites. GPS time of the image capture device may be determined based on difference between the broadcast times of the GPS signals and reception times of the GPS signals.

The visual content may be captured during a capture duration. The captured visual content may be contained within video frames. The video frames may include an initial video frame containing the visual content captured at a beginning moment in the capture duration, a later video frame containing the visual content captured at a later moment subsequent to the beginning moment in the capture duration, intermediate video frames containing the visual content captured between the beginning moment and the later moment in the capture duration, and/or other video frames. Times for the initial video frame and the intermediate video frames may be determined based on the GPS time of the image capture device for the later video frame and/or other information. The determined times for the initial video frame and the intermediate video frames may be associated with the initial video frame and the intermediate video frames.

An electronic storage may store information relating to image capture device, information relating to GPS receiver, information relating to GPS satellite, information relating to GPS signal, information relating to broadcast time of GPS signal, information relating to reception time of GPS signal, information relating to GPS time of image capture device, information relating to visual content, information relating to video frame, information relating to time for video frame, and/or other information.

The housing may carry one or more components of the image capture device. The housing may carry (be attached to, support, hold, and/or otherwise carry) one or more of an image sensor, an optical element, a GPS receiver, a processor, an electronic storage, and/or other components.

The image sensor may be configured to generate a visual output signal and/or other output signals. The visual output signal may convey visual information defining visual content based on light that becomes incident thereon and/or other information.

The optical element may be configured to guide light within a field of view to the image sensor. The field of view may be less than 180 degrees. The field of view may be equal to 180 degrees. The field of view may be greater than 180 degrees.

The GPS receiver may be configured to receive GPS signals from GPS satellites. The GPS signals may convey broadcast times of the GPS signals. GPS time of the image capture device may be determined based on difference between the broadcast times of the GPS signals and reception times of the GPS signals and/or other information.

In some implementations, greater number of instances of the GPS receiver receiving the GPS signals from the GPS satellites may result in greater accuracy of the GPS time of the image capture device determined based on the difference between the broadcast times of the GPS signals and the reception times of the GPS signals.

The processor(s) may be configured by machine-readable instructions. Executing the machine-readable instructions may cause the processor(s) to facilitate utilizing GPS timing for video frames. The machine-readable instructions may include one or more computer program components. The computer program components may include one or more of a capture component, a time component, an association component, and/or other computer program components.

The capture component may be configured to capture the visual content during a capture duration. The captured visual content may be contained within video frames. The video frames may include an initial video frame, a later video frame, intermediate video frames, and/or other video frames. The initial video frame may contain the visual content captured at a beginning moment in the capture duration. The later video frame may contain the visual content captured at a later moment in the capture duration. The later moment may be subsequent to the beginning moment. The intermediate video frames may contain the visual content captured between the beginning moment and the later moment in the capture duration.

The time component may be configured to determine times for the initial video frame and the intermediate video frames. The times for the initial video frame and the intermediate video frames may be determined based on the GPS time of the image capture device for the later video frame and/or other information.

In some implementations, the later moment in the capture duration may be an end moment in the capture duration, and the later video frame may be a final video frame containing the visual content captured at the end moment in the capture duration. In some implementations, the later moment in the capture duration may be a moment at which GPS lock is established for the image capture device, and the later video frame may be a non-final video frame containing the visual content captured at the moment at which the GPS lock is established for the image capture device.

In some implementations, the visual content may be captured at a fixed rate. The times for the initial video frame and the intermediate video frames may be determined by backtracking from the GPS time of the image capture device for the later video frame (final video frame, non-final video frame) based on the fixed rate and/or other information.

In some implementations, the determination of the times for the initial video frame and the intermediate video frames based on the GPS time of the image capture device for the later video frame may include changes in times of the image capture device corresponding to the initial video frame and the intermediate video frames. The times of the image capture device corresponding to the initial video frame and the intermediate video frames may be changed based on the GPS time of the image capture device for the later video frame and/or other information.

In some implementations, the changes in the times of the image capture device corresponding to the initial video frame and the intermediate video frames based on the GPS time of the image capture device for the later video frame may allow for changes to minute and second of the times of the image capture device corresponding to the initial video frame and the intermediate video frames. The changes in the times of the image capture device corresponding to the initial video frame and the intermediate video frames based on the GPS time of the image capture device for the later video frame may not allow for changes to hour of the times of the image capture device corresponding to the initial video frame and the intermediate video frames.

The association component may be configured to associate the determined times for the initial video frame and the intermediate video frames with the initial video frame and the intermediate video frames. In some implementations, the association of the determined times for the initial video frame and the intermediate video frames with the initial video frame and the intermediate video frames may include generation and/or modification of timecodes for the initial video frame and the intermediate video frames. The timecodes for the initial video frame and the intermediate video frames may be modified based on the determined times for the initial video frame and the intermediate video frames, and/or other information.

In some implementations, the initial video frame and the intermediate video frames may be time-synchronized with video frames of other visual content based on the timecodes for the initial video frame and the intermediate video frames, and/or other information. In some implementations, the time-synchronization of the initial video frame and the intermediate video frames with the video frames of the other visual content may provide frame-level synchronization.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
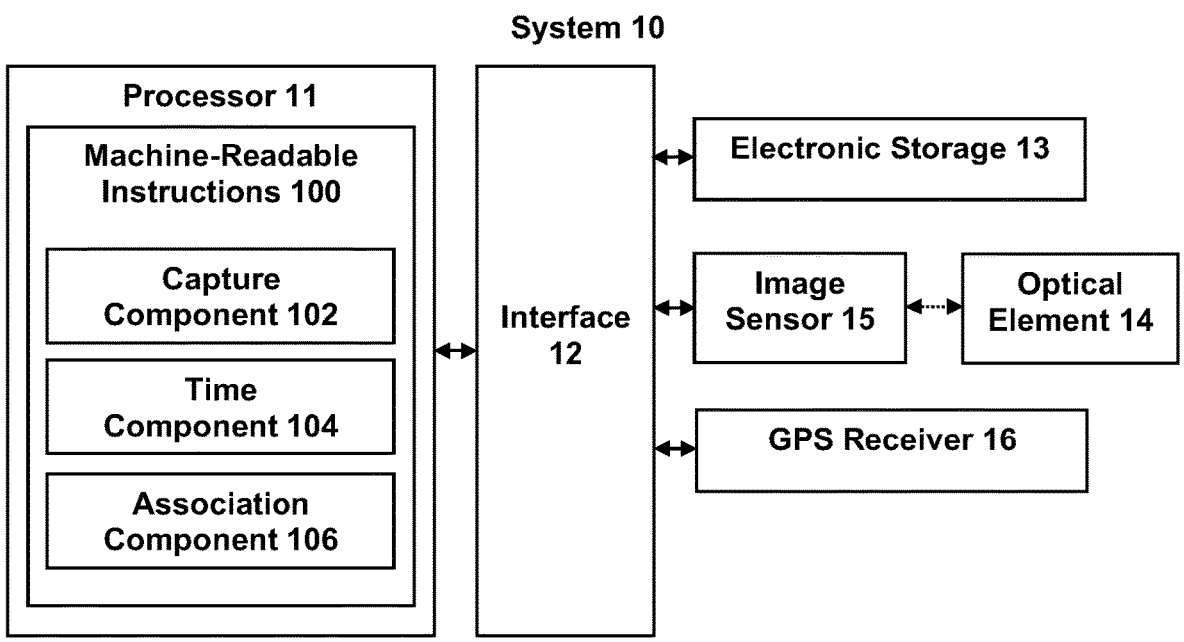
FIG. 1 illustrates an example system that utilizes GPS timing for video frames.

FIG. 1 illustrates a system 10 for utilizing Global Positioning System (GPS) timing for video frames captured by an image capture device. The system 10 may include one or more of a processor 11, an interface 12 (e.g., bus, wireless interface), an electronic storage 13, an optical element 14, an image sensor 15, a GPS receiver 16, and/or other components. The system 10 may include and/or be part of an image capture device. The image capture device may include a housing, and one or more of the optical element 14, the image sensor 15, the GPS receiver 16, and/or other components of the system 10 may be carried by the housing the image capture device. The optical element 14 may guide light within a field of view to the image sensor 15. The image sensor 15 may generate a visual output signal conveying visual information defining visual content based on light that becomes incident thereon. The GPS receiver 16 may receive GPS signals conveying broadcast times of the GPS signals from GPS satellites. GPS time of the image capture device may be determined based on difference between the broadcast times of the GPS signals and reception times of the GPS signals.

The visual content may be captured by the processor 11 during a capture duration. The captured visual content may be contained within video frames. The video frames may include an initial video frame containing the visual content captured at a beginning moment in the capture duration, a later video frame containing the visual content captured at a later moment subsequent to the beginning moment in the capture duration, intermediate video frames containing the visual content captured between the beginning moment and the later moment in the capture duration, and/or other video frames. Times for the initial video frame and the intermediate video frames may be determined by the processor 11 based on the GPS time of the image capture device for the later video frame and/or other information. The determined times for the initial video frame and the intermediate video frames may be associated with the initial video frame and the intermediate video frames by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to image capture device, information relating to GPS receiver, information relating to GPS satellite, information relating to GPS signal, information relating to broadcast time of GPS signal, information relating to reception time of GPS signal, information relating to GPS time of image capture device, information relating to visual content, information relating to video frame, information relating to time for video frame, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. A video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the GPS receiver 16 of the system 10 may be carried by the housing of the image capture device. The housing may carry other components, such as the processor 11 and the electronic storage 13.

Figure 3:
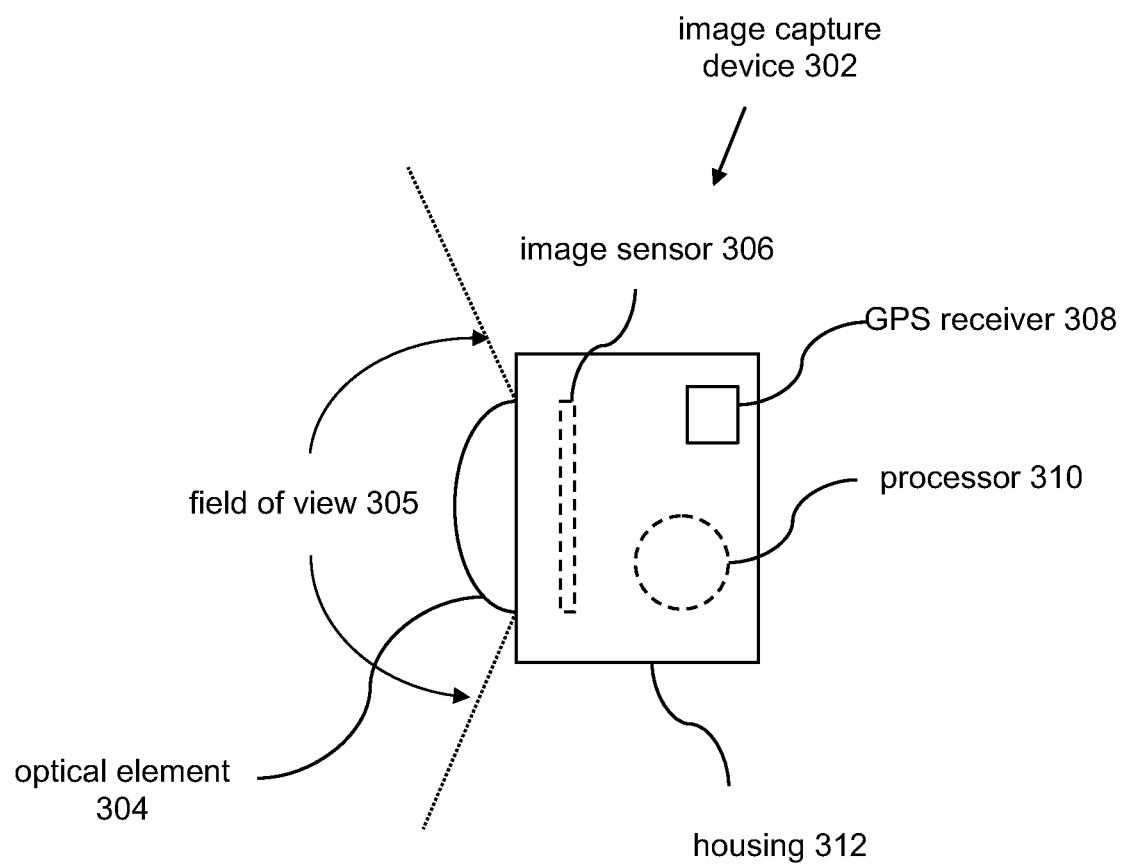
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a GPS receiver 308, a processor 310, and/or other components.

One or more components of the image capture device 302 may be the same as, be similar to, and/or correspond to one or more components of the system 10. For example, the processor 308 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The GPS receiver 308 may be the same as, be similar to, and/or correspond to the GPS receiver 16. The housing may carry other components, such as the electronic storage 13. The image capture device 302 may include other components not shown in FIG. 3. For example, the image capture device 302 may include one or more sound sensors configured to capture audio content. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The GPS receiver 308 may refer to a satellite navigation device. The GPS receiver 308 may be capable of receiving information from GPS satellites and determine location of the GPS receiver 308 based on the information received from the GPS satellites. The GPS receiver 308 may be configured to receive one or more GPS signals from one or more GPS satellites. The GPS signals may convey broadcast times of the GPS signals. A broadcast time of a GPS signal may refer to time when the GPS signal is transmitted by a GPS satellite. The GPS signals may convey information that defines the broadcast time of the GPS signals. For example, a GPS signal transmitted by a GPS satellite may convey information that defines the time at which the GPS signal was transmitted by the GPS satellite.

GPS time of the GPS receiver 308/the image capture device 302 may be determined based on difference between the broadcast times of the GPS signals and reception times of the GPS signals and/or other information. Reception time of a GPS signal may refer to time when the GPS signal is received by the GPS receiver 308.

GPS time of the GPS receiver 308/the image capture device 302 may refer to time at the location of the GPS receiver 308/the image capture device 302 as determined based on the GPS signals. GPS time of the GPS receiver 308/the image capture device 302 may refer to time at the location of the GPS receiver 308/the image capture device 302 as determined using broadcast times conveyed by the GPS signals. In some implementations, GPS time may be determined by (1) determining distances between the GPS receiver 308 and the GPS satellites based on the difference between the broadcast times of the GPS signals and reception times of the GPS signals, (2) determining the location of the GPS receiver 308 based on the distances between the GPS receiver 308 and the GPS satellites, and the locations of the GPS satellites, and (3) determining the GPS time from broadcast times of the GPS signals by taking into account how much time the GPS signals took to reach the GPS receiver 308.

In some implementations, greater number of instances of the GPS receiver 308 receiving the GPS signals from the GPS satellites may result in greater accuracy of the GPS time of the image capture device determined based on the difference between the broadcast times of the GPS signals and the reception times of the GPS signals. Greater number of instances of communication between the GPS receiver 308 and the GPS satellites may include the GPS receiver 308 receiving more GPS signals from the same GPS satellites and/or the GPS receiver 308 receive GPS signals from more GPS satellites. Greater the number of instances of the GPS receiver 308 receiving the GPS signals from the GPS satellites may result in greater amount of GPS data from which the location and the GPS time of the GPS receiver 308/the image capture device 302 may be determined. Greater amount of the GPS signals/GPS data received by the GPS receiver 308 may enable more accurate determination of the location and the GPS time of the GPS receiver 308/the image capture device 302.

Figure 4:
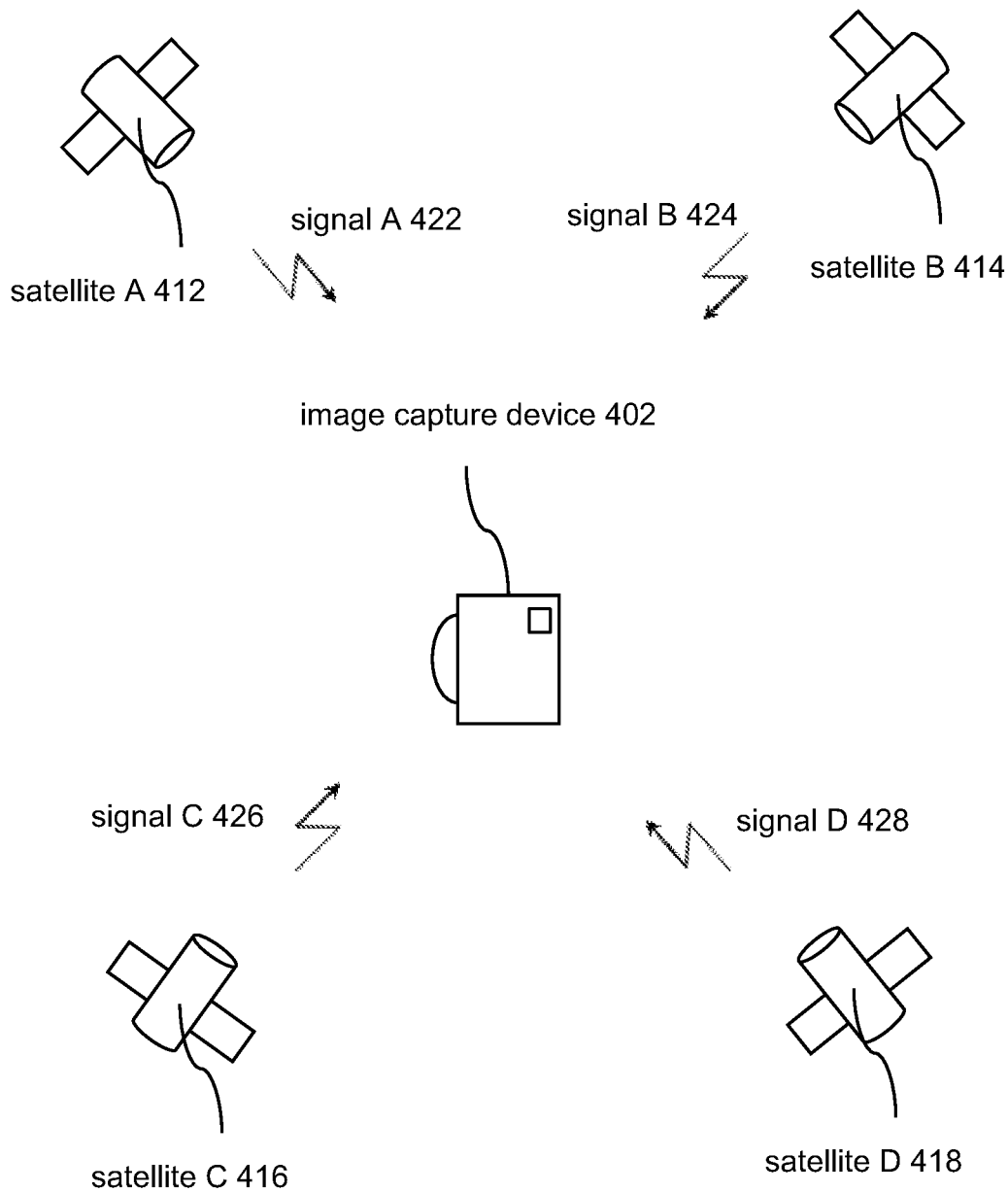
FIG. 4 illustrates example reception of GPS signals by an image capture device.

FIG. 4 illustrates example reception of GPS signals by an image capture device 402. The image capture device 402 may include a GPS receiver, and may use the GPS receiver to receive GPS signals (signal A 422, signal B 424, signal C 426, signal D 428) from GPS satellites (satellite A 412, satellite B 414, satellite C 416, satellite D 418). When the image capture device 402 has been operating (e.g., turned on, recording video) for a short amount of time, the image capture device 402 may not have received any of the signals 422, 424, 426, 428 or may have received only some of the signals 422, 424, 426, 428, resulting in poor location and GPS time determination.

For instance, when the image capture device 402 powers on and starts capture of content (e.g., recording video), the image capture device 402 may not have precise/accurate GPS time. Precise/accurate GPS time may require GPS lock, which may take more time to establish if the image capture device 402 has moved or it has been a longer time since the image capture device was last used 402. For example, even in ideal conditions (e.g., clear skies), it may take more than thirty seconds for the image capture device 402 to have GPS lock. Thus, if the image capture device 402 starts recording a video soon after powering on, the time of the first video frame(s) that are captured may be based on inaccurate internal clock of the image capture device 402.

After the image capture device 402 has been operating for a longer amount of time, the image capture device 402 may have received the signals 422, 424, 426, 428 from all of the satellites 412, 414, 416, 418 and/or may have received different versions of the signals 422, 424, 426, 428 at different times (e.g., received the signal A 422 transmitted by the satellite A 412 at different times with different broadcast times). Greater amount of GPS data from greater number of GPS signal reception may enable the image capture device 402 to determine its location more accurately and therefore determine its GPS time more accurately.

GPS time may be used to set the internal clock of the image capture device 402, which may help with timing of short captures. A capture that starts and stops before GPS lock may use the internal clock of the image capture device 402 for its timing (timecode). If the internal clock has been accurately set recently using precise/accurate GPS time, the drift of the internal clock may be minimal such that the timing provided by the internal clock is precise/accurate. For example, the internal clock of the image capture device 402 may drift ±2 seconds a day. If the internal clock was accurately set an hour ago via GPS time, then the internal clock may be sufficiently precise/accurate to provide frame-level synching (e.g., for video editing). Metadata for the last time the internal clock was set via GPS time may provide indication of the preciseness/accuracy of the internal clock/recorded timecode. When GPS signals are received during capture, the GPS time during capture may be used to correct the timing (e.g., in timecode track) for higher precision/accuracy. Internal clock previously set using GPS time may offer a reasonably precise fallback if GPS signals are not received/GPS lock is not established.

Referring back to FIG. 3, the processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the GPS receiver 308, and/or facilitate transfer of information from the image sensor 306 and/or the GPS receiver 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

For example, the image capture device 302 may capture video frames of a video during a capture duration. During the capture duration, the image capture device 302 may receive GPS signals from GPS satellites through the GPS receiver 308. GPS time of the image capture device 302 may be determined base on difference between broadcast times and reception times of the GPS signals. The GPS times of the image capture device 302 may be more accurate at the end of the capture duration than at the beginning of the capture duration (since more GPS data would have been received during the capture duration).

The GPS time of the image capture device 302 at the end of the capture duration (or at a moment when sufficiently accurate GPS time/location has been determined) may be used to determine the times for the other video frames. The times for the other video frames may be determined by backtracking the GPS time at the end of the capture duration to the beginning of the capture duration. Backtracking the GPS time at the end of the capture duration to the beginning of the capture duration may include subtracting the GPS time at the end of the capture duration with the amount of times between video frame capture. For example, video frames may have been captured at a known rate (e.g., 30, 60, 120, 240 frames per second) by the image capture device 302 and this known rate may be used to determine, from the GPS time at the end of the capture duration (corresponding to the last video frame captured), the times of capture of earlier video frames. The times of capture determined for the video frames using the GPS time may be more accurate than the times of capture as reflected by the internal clock of the image capture device 302.

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate utilizing GPS timing for video frames. The machine-readable instructions 100 may include one or more computer program components. The machine-readable instructions 100 may include one or more of a capture component 102, a time component 104, an association component 106, and/or other computer program components.

The capture component 102 may be configured to capture the visual content. The visual content may be captured during a capture duration. A capture duration may refer to a time duration in which visual content is captured. The visual content may be captured using one or more image sensors (e.g., the image sensor 15). The visual content may be captured using light guided to the image sensor(s) via one or more optical elements (e.g., the optical element 14). For example, referring to FIG. 3, the visual content may be captured using the image sensor 306. The visual content may be captured using light guided to the image sensor 306 via the optical element 304.

Capturing visual content during a capture duration may include using, recording, storing, and/or otherwise capturing the visual content during the capture duration. For instance, visual content may be captured while the image capture device is operating in a record mode (e.g., video recording mode, image capture mode) and/or operating in a preview mode (e.g., showing preview of visual content to be captured on a display). The visual content may be captured for use in generating images and/or video frames.

For example, during a capture duration, the capture component 102 may use the visual output signal generated by the image sensor 15 and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks.

The captured visual content may be contained within video frames. The video frames may include different video frames captured at different moments within the capture duration. The video frames may include an initial video frame, a later video frame, intermediate video frames, and/or other video frames.

The initial video frame refer to a video frame captured at the beginning of the capture duration (e.g., first video frame in the video). The initial video frame may contain the visual content captured at a beginning moment in the capture duration.

The later video frame may refer to a video frame captured after the initial video frame. The later video frame may contain the visual content captured at a later moment subsequent to the beginning moment in the capture duration. In some implementations, the later video frame may refer to a video frame captured at the end of the capture duration (e.g., last video frame in the video). In some implementations, the later video frame may refer to a video frame captured at a moment at which/after GPS lock (sufficient GPS data is received to establish location) is established for the image capture device/the GPS receiver 16. In some implementations, the later video frame may refer to a video frame captured at a moment at which/after location/GPS time of the for the image capture device/the GPS receiver 16 is sufficiently established (e.g., location of the image capture device is determined with a threshold distance accuracy to determine GPS time with frame-accurate precision; GPS time of the image capture device is determined with frame-accurate precision).

The intermediate video frames may refer to video frames captured between the initial video frame and the later video frame. The intermediate video frames may contain the visual content captured between the beginning moment and the later moment in the capture duration.

In some implementations, the video frames may include video frames captured after the later video frame. Such video frames may contain the visual content captured after the later moment in the capture duration.

The time component 104 may be configured to determine times for the video frames. The time component 104 may be configured to determine times for the initial video frame, the intermediate video frames, and/or other video frames. The times for the initial video frame and the intermediate video frames may be determined based on the GPS time of the image capture device for the later video frame (containing the visual content captured at the later moment) and/or other information. That is, times for video frames captured earlier in the capture duration may be determined based on GPS time for a video frame captured later in the capture duration. Such determination of times for earlier captured video frames takes advantage of situations in which GPS location/time becomes more accurate with passage of time due to more GPS data being received from GPS satellites.

Rather than utilizing the start time of capture (e.g., start time of video recording) to determine times for the video frames, the times for the video frames may be determined based on more accurate GPS time at a later moment in the capture duration. In some implementations, the later moment in the capture duration (at which the visual content of the later video frame is captured) may be an end moment in the capture duration, and the later video frame may be a final video frame containing the visual content captured at the end moment in the capture duration. For instance, times for video frames captured earlier in the capture duration may be determined based on GPS time for the last video frame captured in the capture duration (e.g., GPS time at the end of recording).

In some implementations, the later moment in the capture duration (at which the visual content of the later video frame is captured) may be a moment at which GPS lock is established for the image capture device, and the later video frame may be a non-final video frame containing the visual content captured at the moment at which the GPS lock is established for the image capture device. For instance, times for video frames captured earlier in the capture duration may be determined based on GPS time for the video frame captured when GPS lock is established (e.g., GPS time with GPS lock established).

The times for the video frames captured earlier in the capture duration may be determined based on the GPS time for the later video frame and the rate at which the earlier video frames were captured. The rate at which the earlier video frames were captured may be used to determine how much time should be subtracted from the GPS time for the later video frame to arrive at the times for the earlier video frames. The times for the earlier video frames may be determined by backtracking from the GPS time of the image capture device for the later video frame based on the rate of capture and/or other information. In some implementations, the visual content may be captured at a fixed rate, and the times for the earlier video frames (e.g., initial video frame, the intermediate video frames) may be determined by backtracking from the GPS time of the image capture device for the later video frame (final video frame, non-final video frame) based on the fixed rate and/or other information.

Figure 5:
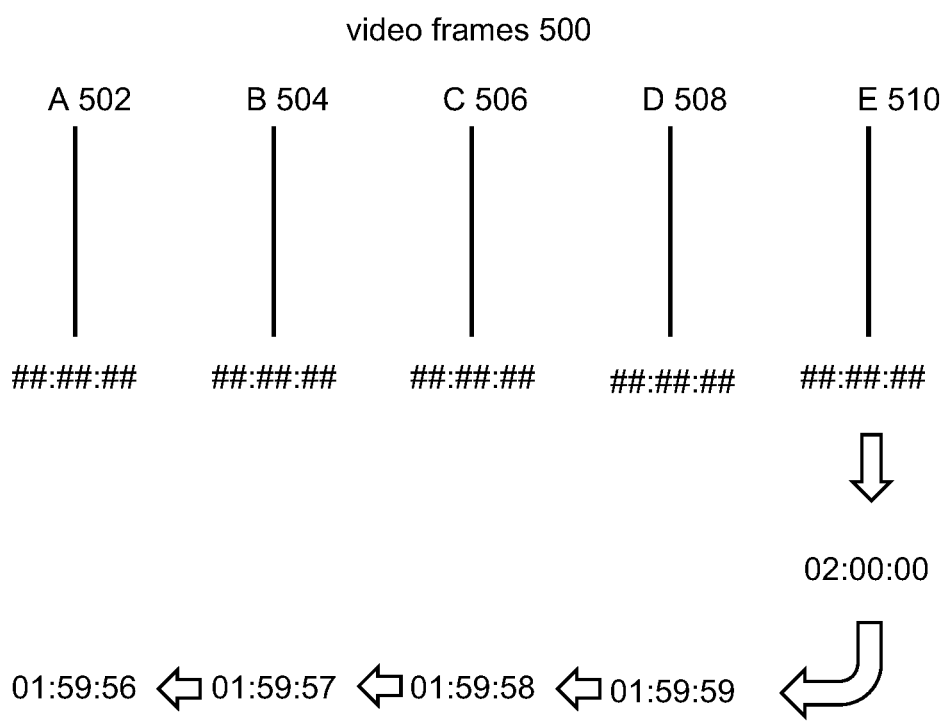
FIG. 5 illustrates example backtracking of earlier video frame times from GPS time of a later video frame.

FIG. 5 illustrates example backtracking of earlier video frame times from GPS time of a later video frame. An image capture device may have captured video frames 500 (e.g., video frame A 502, video frame B 504, video frame C 506, video frame D 508, video frame E 510). The video frame E 510 may have been captured later in time than the video frame A 502, the video frame B 504, the video frame C 506, and the video frame D 508. GPS time for the video frame E 510 may determined to be 2 PM. The video frames 500 may have been captured at a fix rate of one frame per second. Times for the video frame A 502, the video frame B 504, the video frame C 506, and the video frame D 508 may be determined by backtracking from the GPS time of the video frame E 510. Backtracking from the GPS time of the video frame E 510 may include subtracting from the GPS time the amount of time between capture of video frames. Time for the video frame D 508 may be determined by subtracting one second from the GPS time of the video frame E 510, time for the video frame C 506 may be determined by subtracting two seconds from the GPS time of the video frame E 510 (or one second from the time of the video frame D 508), and so forth. Rather than the times of the video frames being determined based on the time at which recording was started, the times of the video frames may be determined based on the time at which recording was stopped/GPS lock was established.

In some implementations, the determination of the times for video frames (e.g., the initial video frame and the intermediate video frames) based on the GPS time of the image capture device for the later video frame may include changes in times of the image capture device corresponding to the initial video frame and the intermediate video frames. The times of the video frames may correspond to (e.g., be same as) the time of the image capture device when the video frames were captured. The times of the image capture device corresponding to the video frames (e.g., the initial video frame and the intermediate video frames) may be changed based on the GPS time of the image capture device for the later video frame and/or other information. Existing times for the video frames may be changed based on the times for the video frames determined using the GPS time. For example, timestamps and/or timecodes for the video frames may be changed based on the new timestamp and/or new timecodes determined using the GPS time.

In some implementations, the changes in the times of the image capture device corresponding to the video frames (e.g., initial video frame and the intermediate video frames) based on the GPS time of the image capture device for the later video frame may allow for changes to minute and second of the times of the image capture device corresponding to the video frames, while not allowing for changes to hour of the times of the image capture device corresponding to the video frames. For example, a user of the image capture device may manually set the time of the image capture device. The time of the image capture device may be set incorrectly (e.g., with the wrong zone time information, with the wrong minute information) and/or may drift over time. The time component 104 may honor the hour set by the user while overriding the minute and the second set by the user using the GPS time. For example, if the hour time determined for the video frames based on the GPS time for the later video frame is not the same as the hour time of the image capture device when the video frames were captured, the hour time of the image capture device may be preserved for use in generating timestamps/timecodes.

In some implementations, the changes in the times of the image capture device corresponding to the video frames (e.g., initial video frame and the intermediate video frames) based on the GPS time of the image capture device for the later video frame may honor time zone set by the user. For example, a user of the image capture device may manually set the time zone of the image capture device. The time component 104 may honor the time zone set by the user by overriding the hour determined using the GPS time. For example, for time zones that vary by one-hour, if the hour time determined for the video frames based on the GPS time for the later video frame is not the same as the hour time of the time zone set by the user, the hour time of the time zone set by the user may be preserved for use in generating timestamps/timecodes. In some implementations, time may be preserved to the nearest 15 minutes. Such preservation of the time may enable honoring time zones that vary by a time amount other than one-hour (e.g., half-hour time zones, quarter-hour time zones). The times of the image capture device may be changed to correct clock drift errors and/or user-entered times while preserving the likely time zone. In some implementation, the error correction from GPS time that preserves any time zone may be ±7.5 minutes. If GPS location of the image capture device is used, more precise time zone calculations may be applied.

In some implementations, the GPS time of the image capture device for the later video frame may be used to adjust the times of the image capture device. For example, the GPS time of the image capture device for the later video frame may be used to correct inaccuracies in the time kept (e.g., via real-time clock) by the image capture device.

The association component 106 may be configured to associate the determined times for video frames with the video frames. The association component 106 may be configured to associate the determined times for the initial video frame with the initial video frame. The association component 106 may be configured to associate the determined times for the intermediate video frames with the intermediate video frames. The association component 106 may be configured to associate the determined times for other video frames other video frames. Associating a video frame with a determined time may include one or more connecting the video frame with the determined time, relating the video frame with the determined time, assigned the determined time to the video frame, and/or otherwise associating the video frame with the determined time. In some implementations, associating a video frame with a determined time may include generating a time for the video frame, with the time being the determined time. In some implementations, associating a video frame with a determined time may include modifying a time for the video frame to the determined time.

The times associated with the video frames may be stored as timecodes, within the video frames, within metadata of the video frames, and/or in other form. For example, associating the determined times for the initial video frame and the intermediate video frames with the initial video frame and the intermediate video frames may include generation and/or modification of timecodes for the initial video frame and the intermediate video frames. The timecodes for the initial video frame and the intermediate video frames may be modified based on the determined times for the initial video frame and the intermediate video frames, and/or other information. The timecodes for the initial video frame and the intermediate video frames may be modified to timecode values that reflect/correspond to the determined times for the initial video frame and the intermediate video frames. Thus, GPS time of the image capture device may be used to determine/set the times for individual video frames captured by the image capture device.

In some implementations, the video frames captured by the image capture device (e.g., the initial video frame, the intermediate video frames, other video frames) may be time-synchronized with video frames of other visual content based on the timecodes for the initial video frame and the intermediate video frames, and/or other information. Other visual content may have been captured by one or more other image capture devices. The times of the other video frames may be determined using GPS times of the other image capture devices as described herein. Times of video frames captured by different image capture devices being determined using GPS times may automatically establish time-synchronization between video frames captured by different/multiple image capture devices.

With the times of the video frames captured by different/multiple image capture devices time-synchronized through GPS times, the video frames captured by different/multiple image capture devices may be used to generate a video edit without loosing timing of the video frames. The time-synchronization of the video frames captured by the image capture device with the video frames captured by other image capture device(s) may provide frame-level synchronization between the video frames. For example, the timecodes/timestamps of the video frames determined using GPS times as described herein may be accurate enough to provide frame-level synchronization for video editing. Frame-level synchronization between the frames may include the timing (e.g., timecodes) of the video frames being accurate to within couple frames. Frame-level synchronization between the video frames may enable use of multi-clip editing effects (e.g., cut/transition between video clips captured by different/multiple image capture devices, side-by-side/picture-in-picture view of video clips captured by different/multiple image capture devices) without losing timing. For instance, frame-level synchronization between the video frames may enable use of multi-clip editing effects without losing timing of the video frames to audio recording (e.g., preserve lip-syncing when using multi-clip editing effects). Frame-level synchronization between the video frames may be established based on the times associated with the video frames and without any need for post-processing of video frames/related content (e.g., analysis of visual content/audio content to determine time-offsets between video frames captured by different/multiple image capture devices) to establish synchronization.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. For example, one or more computer program component may be located within processing unit(s) of an image capture device and one or more computer program component may be located within processing unit(s) of a computing device.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
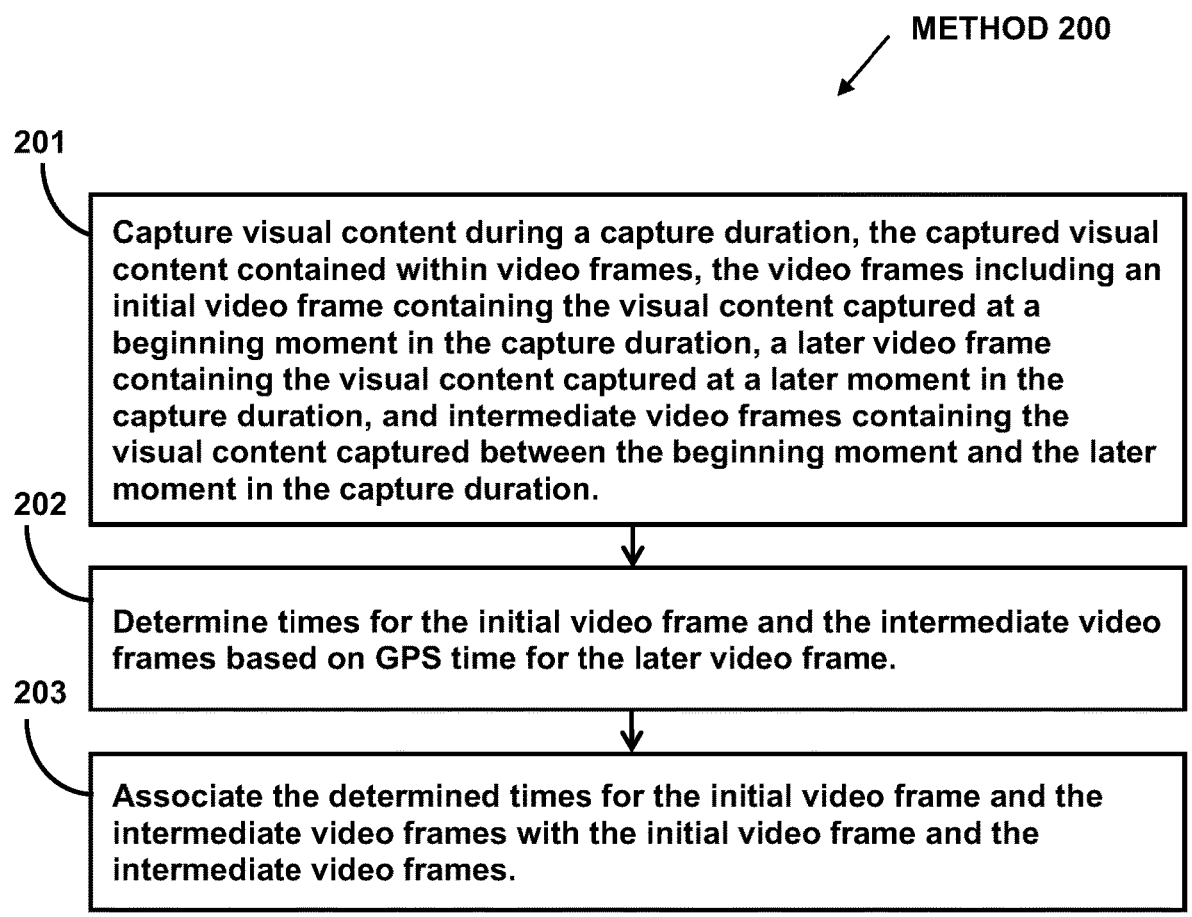
FIG. 2 illustrates an example method for utilizing GPS timing for video frames.

FIG. 2 illustrates method 200 for utilizing GPS timing for video frames. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a GPS receiver, and/or other components. The optical element may guide light within a field of view to the image sensor. The image sensor may generate a visual output signal conveying visual information defining visual content based on light that becomes incident thereon. The GPS receiver may receive GPS signals conveying broadcast times of the GPS signals from GPS satellites. GPS time of the image capture device may be determined based on difference between the broadcast times of the GPS signals and reception times of the GPS signals.

At operation 201, the visual content may be captured during a capture duration. The captured visual content may be contained within video frames. The video frames may include an initial video frame containing the visual content captured at a beginning moment in the capture duration, a later video frame containing the visual content captured at a later moment subsequent to the beginning moment in the capture duration, intermediate video frames containing the visual content captured between the beginning moment and the later moment in the capture duration, and/or other video frames. In some implementation, operation 201 may be performed by a processor component the same as or similar to the capture component 102 (Shown in FIG. 1 and described herein).

At operation 202, times for the initial video frame and the intermediate video frames may be determined based on the GPS time of the image capture device for the later video frame and/or other information. In some implementations, operation 202 may be performed by a processor component the same as or similar to the time component 104 (Shown in FIG. 1 and described herein).

At operation 203, the determined times for the initial video frame and the intermediate video frames may be associated with the initial video frame and the intermediate video frames. In some implementations, operation 203 may be performed by a processor component the same as or similar to the association component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for utilizing Global Positioning System (GPS) timing, the system comprising:
one or more physical processors configured by machine-readable instructions to:
obtain video frames captured by an image capture device during a capture duration, the video frames captured at different moments in the capture duration;
determine times for previously captured ones of the video frames based on GPS time of the image capture device for a later captured one of the video frames; and
associate the determined times for the previously captured ones of the video frames with the previously captured ones of the video frames.

2. The system of claim 1, wherein:
a GPS receiver is carried by the image capture device;
the GPS receiver is configured to receive GPS signals from GPS satellites, the GPS signals conveying broadcast times of the GPS signals,
the GPS time of the image capture device is determined based on difference between the broadcast times of the GPS signals and reception times of the GPS signals; and
greater number of instances of the GPS receiver receiving the GPS signals from the GPS satellites results in greater accuracy of the GPS time of the image capture device determined based on the difference between the broadcast times of the GPS signals and the reception times of the GPS signals.

3. The system of claim 1, wherein the association of the determined times for the previously captured ones of the video frames with the previously captured ones of the video frames includes generation or modification of timecodes for the previously captured ones of the video frames based on the determined times for the previously captured ones of the video frames.

4. The system of claim 3, wherein the previously captured ones of the video frames are time-synchronized with video frames of other visual content based on the timecodes for the previously captured ones of the video frames.

5. The system of claim 4, wherein the time-synchronization of the previously captured ones of the video frames with the video frames of the other visual content provide frame-level synchronization.

6. The system of claim 1, wherein the later captured one of the video frames is a final video frame captured at an end moment in the capture duration.

7. The system of claim 6, wherein the video frames are captured at a fixed rate, and the times for the previously captured ones of the video frames are determined by backtracking from the GPS time of the image capture device for the final video frame based on the fixed rate.

8. The system of claim 1, wherein the determination of the times for the previously captured ones of the video frames based on the GPS time of the image capture device for the later captured one of the video frames includes changes in times of the image capture device corresponding to the previously captured ones of the video frames based on the GPS time of the image capture device for the later captured one of the video frames.

9. The system of claim 1, wherein the later captured one of the video frames is a non-final video frame captured at a moment at which GPS lock is established for the image capture device.

10. A method for utilizing Global Positioning System (GPS) timing, the method performed by a computing system including one or more processors, the method comprising:
   obtaining, by the computing system, video frames captured by an image capture device during a capture duration, the video frames captured at different moments in the capture duration;
   determining, by the computing system, times for previously captured ones of the video frames based on GPS time of the image capture device for a later captured one of the video frames; and
   associating, by the computing system, the determined times for the previously captured ones of the video frames with the previously captured ones of the video frames.

11. The method of claim 10, wherein:
a GPS receiver is carried by the image capture device;
the GPS receiver is configured to receive GPS signals from GPS satellites, the GPS signals conveying broadcast times of the GPS signals,
the GPS time of the image capture device is determined based on difference between the broadcast times of the GPS signals and reception times of the GPS signals; and
greater number of instances of the GPS receiver receiving the GPS signals from the GPS satellites results in greater accuracy of the GPS time of the image capture device determined based on the difference between the broadcast times of the GPS signals and the reception times of the GPS signals.

12. The method of claim 10, wherein associating the determined times for the previously captured ones of the video frames with the previously captured ones of the video frames includes generating or modifying timecodes for the previously captured ones of the video frames based on the determined times for the previously captured ones of the video frames.

13. The method of claim 12, wherein the previously captured ones of the video frames are time-synchronized with video frames of other visual content based on the timecodes for the previously captured ones of the video frames.

14. The method of claim 13, wherein the time-synchronization of the previously captured ones of the video frames with the video frames of the other visual content provide frame-level synchronization.

15. The method of claim 10, wherein the later captured one of the video frames is a final video frame captured at an end moment in the capture duration.

16. The method of claim 15, wherein the video frames are captured at a fixed rate, and the times for the previously captured ones of the video frames are determined by backtracking from the GPS time of the image capture device for the final video frame based on the fixed rate.

17. The method of claim 10, wherein determining the times for the previously captured ones of the video frames based on the GPS time of the image capture device for the later captured one of the video frames includes changing times of the image capture device corresponding to the previously captured ones of the video frames based on the GPS time of the image capture device for the later captured one of the video frames.

18. The method of claim 10, wherein the later captured one of the video frames is a non-final video frame captured at a moment at which GPS lock is established for the image capture device.

19. A system for utilizing Global Positioning System (GPS) timing, the system comprising:
   one or more physical processors configured by machine-readable instructions to:
      obtain video frames captured by an image capture device during a capture duration, the video frames captured at different moments in the capture duration;
      determine times for previously captured ones of the video frames based on GPS time of the image capture device for a later captured one of the video frames, wherein the determination of the times for the previously captured ones of the video frames based on the GPS time of the image capture device for the later captured one of the video frames includes changes in times of the image capture device corresponding to the previously captured ones of the video frames based on the GPS time of the image capture device for the later captured one of the video frames; and
      associate the determined times for the previously captured ones of the video frames with the previously captured ones of the video frames, wherein the association of the determined times for the previously captured ones of the video frames with the previously captured ones of the video frames includes generation or modification of timecodes for the previously captured ones of the video frames based on the determined times for the previously captured ones of the video frames.

20. The system of claim 19, wherein the later captured one of the video frames is:
   a final video frame captured at an end moment in the capture duration; or
   a non-final video frame captured at a moment at which GPS lock is established for the image capture device.

* * * * *